United States Patent [19]

Darrow

[11] 3,747,014

[45] July 17, 1973

[54] FAIL-SAFE ELECTRONIC COMPARATOR CIRCUIT

[75] Inventor: John O. G. Darrow, Murrysville, Pa.

[73] Assignee: Westinghouse Air Brake Company, Swissvale, Pa.

[22] Filed: Mar. 15, 1971

[21] Appl. No.: 124,374

[52] U.S. Cl. ............... 331/77, 307/202, 331/113 R, 331/151

[51] Int. Cl. ......................... H03k 3/282, H03b 3/08

[58] Field of Search ............................ 307/235, 260; 328/141; 331/61, 77, 113, 151

[56] References Cited

UNITED STATES PATENTS

| | | | |
|---|---|---|---|
| 3,026,486 | 3/1962 | Pintell | 331/77 X |
| 3,046,535 | 7/1962 | Philbin et al. | 331/113 |
| 2,589,240 | 3/1952 | Frye | 331/151 X |
| 3,161,785 | 12/1964 | Cann | 331/113 X |
| 3,351,872 | 11/1967 | Swift | 331/113 |
| 3,368,166 | 2/1968 | Fletcher | 331/113 X |
| 3,382,457 | 5/1968 | Conway | 331/113 |
| 3,401,274 | 9/1968 | Marsh | 331/113 X |

OTHER PUBLICATIONS

Hurst et al., "Frequency Control of Astable Transistor Multivibrator Circuits"; Electronic Engineering (publication) p. 182–185, 3/1965.

*Primary Examiner*—John W. Huckert
*Assistant Examiner*—L. N. Anagnos
*Attorney*—H. A. Williamson, J. B. Sotak and A. G. Williamson, Jr.

[57] ABSTRACT

This disclosure relates to a fail-safe comparator circuit having a free-running multivibrator powered by two separate d.c. supply voltages. A resonant circuit is coupled to the output of the multivibrator and tuned to the normal resonant frequency of oscillation of the multivibrator so that oscillations having the normally resonant frequency will be induced into the resonant circuit when and only when the two d.c. supply voltages are in agreement and no critical component or circuit failure is present.

8 Claims, 1 Drawing Figure

PATENTED JUL 17 1973 3,747,014
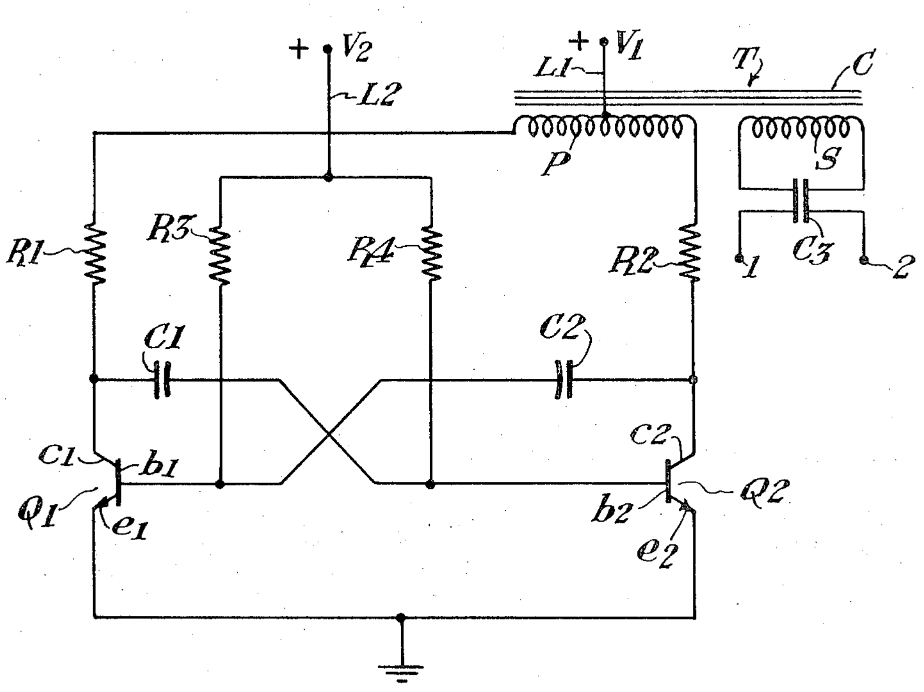
INVENTOR
John O.G. Darrow.
BY
John B. Dotak

FAIL-SAFE ELECTRONIC COMPARATOR CIRCUIT

My invention relates to a fail-safe circuit arrangement and more particularly to an electronic comparator circuit for measuring the amplitudes of two input signals and for producing an output signal when and only when the amplitudes of the two input signals are in agreement and no critical circuit or component failure is present.

Vacuum tube and transistor circuits for comparing the amplitudes of two input signals and producing an output signal when the amplitudes are substantially equal, are old and well known in the art. Normally, these previous comparator circuits are generally acceptable for use in ordinary nonvital applications but are wholly unsatisfactory for employment in special vital operations. For example, in signal and communication systems for railway or mass and/or rapid transit operations, it is mandatory that each portion or circuit of the apparatus operates in a fail-safe manner. Such a stringent operating requirement is essential in order to prevent costly damage to the equipment as well as to preclude serious injury and possible death to employees and passengers. It will be appreciated that a high speed train or mass transit vehicle is an imminently dangerous object if the control system fails in an unsafe manner. Therefore, a less restrictive speed command should never be capable of being simulated by a circuit or component failure. In order to ensure such operation it is necessary to carefully analyze and examine each and every circuit component for all its shortcomings, as well as to optimize the design and layout of the circuit. Thus, it will be appreciated that a comparator circuit which is capable of producing an erroneous output when its inputs are out of agreement is not suitable for use in vital types of control systems.

Accordingly, it is an object of my invention to provide a new and improved comparator circuit which operates in a fail-safe manner.

Another object of my invention is to provide a fail-safe comparator circuit which produces an output signal when its input signals are in agreement.

A further object of my invention is to provide a vital type of comparator circuit which is incapable of producing an output signal during a critical circuit or component failure or when its input signals are not in agreement.

Still another object of my invention is to provide a fail-safe electronic comparator circuit for comparing the level of a pair of d.c. voltages and producing an a.c. output when and only when the levels of the d.c. voltages are in agreement.

Still a further object of my invention is to provide a fail-safe transistorized comparator circuit employing a regenerative feedback oscillator which oscillates at a preselected resonant frequency only when the amplitudes of a pair of inputs are in agreement.

Yet a further object of my invention is to provide a fail-safe transistorized comparator circuit having a free-running oscillator and a tuned circuit for selecting a desired frequency output signal only when the amplitudes of a pair of input signals are substantially equal and no critical circuit or component failure is present.

Still yet another object of my invention is to provide a fail-safe comparator circuit which is economical in cost, simple in design, reliable in operation, durable in use, and efficient in service.

In accordance with the present invention, the unique electronic comparator circuit compares the aplitudes of a pair of inputs. The comparator circuit includes a free-running multivibrator having a turned output circuit. The multivibrator includes a pair of capacitive-coupled transistors in which the base electrodes are connected in common to one of the pair of inputs and in which the collector electrodes are connected in common to the other of the pair of inputs. A transformer has its primary winding coupled to the output circuit of each of the pair of transistors and has its secondary winding tuned to a preselected frequency so that an output having the preselected frequency is produced by the multivibrator when and only when the pair of inputs are in agreement and no critical circuit or component failure is present.

The foregoing objects and other attendant features and advantages will be more readily appreciated as the subject invention becomes better understood by reference to the following detailed description when considered in conjunction wqth the accompanying drawing wherein:

The singer FIGURE is a schematic circuit diagram of a fail-safe electronic comparator circuit embodying the principles of the present invention.

Referring to the single FIGURE of the drawing, there is shown a preferred embodiment of a fail-safe solid state comparator circuit of the present invention. The fail-safe comparator is composed of a relaxation oscillation and a tuned circuit which resonates at the normal frequency of oscillation of the oscillator.

The oscillator is an astable or free-running type of multivibrator which includes a pair of amplifying transistors Q1 and Q2, each having an emitter, a collector, and a base electrode. The two transistor stages of the multivibrator or relaxation oscillator are each connected into a common-emitter configuration. As shown in the drawing, the emitter electrodes *e*1 and *e*2 of transistors Q1 and Q2, respectively, are connected in common and, in turn, are connected to a point of reference potential, such as, ground. The collector electrode *c*1 of transistor Q1 is connected to one end of a center-tapped primary winding P of transformer T via resistor R1. The collector electrode *c*2 of transistor Q2 is connected to the other end of the center-tapped primary winding P via resistor R2. The center tap is connected via a conductive lead L1 to the positive terminal +V1 of a first d.c. supply source. The base terminal *b*1 of transistor Q1 is connected via resistor R3 and lead L2 to a positive terminal +V2 of a second d.c. supply source. A resistor R4 has one end connected to the base electrode *b*2 of transistor Q2 while its other end is connected in common with resistor R3 and lead L2 and, in turn, the positive +V2 terminal. Cross coupling is provided between the collector and base electrodes of each transistor by a pair of timing capacitors. For example, a first capacitor C1 couples the collector electrode *c*1 of transistor Q1 to the base electrode *b*2 of the transistor Q2 while a second capicitor C2 couples collector electrode *c*2 of the transistor Q2 to the base electrode *b*1 of the transistor Q1. The transformer T includes a secondary winding S which is wound upon core C and is thus magnetically coupled to the primary winding P. A tuning capacitor C3 is connected across the secondary winding S of transformer T. In the instant case, a four-terminal type of capacitor is employed in order to ensure that the loss of any single capacitor lead will remove the output from across terminals 1 and 2. The inductive and capacitive values of the secondary winding S and capacitor C3, respectively, are chosen such that they correspond to the normal resonant frequency of the relaxation oscillator during normal operation, as will be presently described.

If necessary, the output across terminals 1 and 2 may be amplified and rectified and applied to some suitable utilization device indicative of agreement of voltages +V1 and +V2.

Turning now to the operation of the present invention it will be assumed that the circuit is intact and that the biasing voltages +V1 and +V2 are substantially equal so that normal operation of the oscillator takes place. Initially, when the voltages V1 and V2 are applied to the circuit, collector current begins to flow in each transistor. The initial currents that flow are approximately equal to each other; however, a perfect circuit balance is practically impossqble and any small circuit dissimilarity will cause the collector current in one transistor to be slightly larger than the collector current in the other transistor. This slightly greater amount of collector current in one transistor will start operation of the multivibrator.

Assuming that the initial collector current of transistor Q1 is slightly greater than the collector current of transistor Q2, the voltage drop across the resistor R1 will cause the voltage at the collector of transistor Q1 to decrease. The decrease in voltage is applied by capacitor C1 to the base *b*2 of transistor Q2 to drive the transistor to cutoff. Simultaneously, the cutting off of transistor Q2 causes its collector to appear at the voltage potential level of +V1 which, in turn, is applied to the base electrode *b*1 through capacitor C2, thereby rendering transistor Q1 fully conductive. That is, the current through transistor Q1 increases steadily as the current through the transistor Q2 decreases steadily until transistor Q2 is cut off. The collector current and collector voltage of the transistor Q1 remain constant until the capacitor C1 begins to discharge. As the capacitor C1 continues to discharge, the reverse biasing on the base electrode *b*2 of transistor Q2 decreases. As the discharging action continues a point is reached at which the base-emitter electrodes of transistor Q2 are again forward biased. The conduction of transistor Q2 causes collector current through the collector electrode *c*2 of transistor Q2 to increase and causes the voltage at the collector electrode *c*2 to decrease. This decrease involtage is fed back through capacitor C2 to the base electrode *b*1 of transistor Q1, thereby reverse-biasing the transistor Q1. This action continues until transistor Q2 is conducting heavily and transistor Q1 is fully cut off.

It will be appreciated that the normal period of oscillation of the multivibrator, namely, the resonant frequency of oscillation is determined by the RC time constants of the circuit parameters. In effect, the timing of the circuit is determined by the voltage applied across the coupling capacitors and the amount of current flowing through them.

That is, the time $t$ is proportional to V/I, where $t$ is representative of one alternation of the resonant frequency of oscillation, V is representative of the voltage applied across the coupling capacitor, and I is representative of the current flowing through the capacitor.

If it is assumed that V is proportional to V2 while I is assumed proportional to V1, then V/I is proportional to V2/V1 which is equal to a constant K. Thus, the resonant frequency of oscillation of the multivibrator will be constant, when V1 is substantially equal to V2, namely, V1 and V2 are in agreement. Thus, by tuning the resonant circuit including secondary winding S and capacitor C3 to the normal resonant frequency of the multivibrator, a sufficient a.c. output voltage will be developed across terminals 1 and 2 when the voltages +V1 and +V2 are in agreement, namely, substantially equal to each other.

If, for some reason, either the voltage V1 or the voltage V2 vaires relative to each other, the time of a half a cycle will vary accordingly. Thus, the variation will change the frequency of oscillation of the multivibrator so that it will not oscillate at resonance of the tuned circuit.

Thus, by appropriately turning the resonant circuit, namely, secondary winding S with capacitor C3, to the normal resonant frequency of the multivibrator, any change in the frequency will result in a dramatic decrease in the a.c. output voltage level that appears across terminals 1 and 2. That is, when V1 and V2 are not in agreement, the change in frequency of oscillation of the multivibrator is accompanied by a reduction in the amount of output voltage that is produced across terminals 1 and 2. Thus, if one or the other d.c. biasing voltages varies relative to each other, a change in frequency will occur and substantially no output signal will be available at output terminals 1 and 2.

Accordingly, it will be appreciated that an induced output signal appearing across terminals 1 and 2 indicates that the biasing voltages are in agreement and that a cricitcl circuit or component failure is not present.

Since the primary winding of transformer T is center tapped, alternate voltages are induced in the respective halves of the primary winding P. Thus the conduction of transistor Q1 induces a voltage of one polarity to the secondary winding S while the conduction of transistor Q2 induces a voltage of an opposite polarity to the secondary winding S. Thus a.c. signals will appear across the secondary winding S during the respective conductive periods of transistors Q1 and Q2.

As previously mentioned, no critical circuit or component failure is capable of simulating an output across terminals 1 and 2. For example, the failure of an active element such as transistors Q1 and Q2 destroy the amplifying qualities of the multivibrator so that oscillations will not occur.

The opening of a load resistor or biasing resistor or of the coupling capacitors destroys the circuit integrity of the multivibrator so that oscillations will not occur. Similary, the opening of the primary or secondary winding of the transformer T destroys the ability of output signals from being produced across terminals 1 and 2. The shorting of turns between the windings reduces the amplitude of the output signal and thus is a safe failure. The shorting of either coupling capacitor destroys the timing characteristics of the multivibrator and thus prevents output signals from being developed across terminals 1 and 2. The resistors are selected of a special composition in that no short circuit can develop in these elements.

Accordingly, it can be seen that this unique comparator circuit produces an output across terminals 1 and 2 when and only when the biasing potentials +V1 and +V2 are in agreement and no critical circuit or component failure is present.

It is readily understood that the complements of the transistor shown in the drawing may be of the opposite polarity by simply reversing the polarity of the biasing voltages, and that other amplifier configurations may also be used, as is well known. It will also be appreciated that various alterations may be made by persons skilled in the art without departing from the spirit and scope of this invention. For example, the primary winding P of the transformer T need not be the center-tapped type but may be a single winding connected to either output circuit of one amplifying stage. In addition, it is understood that the frequency of oscillation may be selected to the desired needs of the particular application for which the comparator is employed. It will also be apparent that other modifications and changes may be made to the presently described invention and therefore it is understood that all change, equivalents, and modifications falling within the spirit and scope of the present invention are herein meant to be included in the appended claims.

Having thus described my invention, what I claim is:

1. A fail-safe electronic comparator circuit comprising, an oscillator circuit having at least two d.c. supply voltages and including a primary winding of a transformer, a tuned circuit having an output and including the secondary winding of said transformer, said tuned circuit tuned to the resonant frequency of said oscillator so that oscillations having said resonant frequency are induced into said tuned circuit when and only when signals applied to both of said at least two d.c. supply voltages are in agreement and no critical component or circuit failure is present in either or both of said oscillator circuit or tuned circuit.

2. A fail-safe electronic comparator circuit as defined in claim 1, wherein said oscillator circuit is a free-running multivibrator.

3. A fail-safe electronic comparator circuit as defined in claim 1, wherein said oscillator circuit includes a pair of transistors forming an astable multivibrator.

4. A fail-safe electronic comparator circuit as defined in claim 1, wherein said oscillator circuit includes a pair of transistors each connected in a common-emitter configuration.

5. A fail-safe electronic comparator circuit as defined in claim 4, wherein one of said at least two d.c. supply voltages is connected to the base electrodes of said transistors, the collector electrodes of the respective transistors are connected to the ends of said primary winding, and the other of said at least two d.c. supply voltages is connected to the center tap of said primary winding.

6. A Fail-safe electronic comparator circuit as defined in claim 1, wherein said oscillator circuit includes a pair of transistors forming a collector-coupled multivibrator.

7. A fail-safe electronic comparator circuit as defined in claim 6, wherein a capacitor is coupled between the respective collector and base electrodes of said transistors.

8. A transistorized comparator comprising, a free-running multivibrator including a first and a second transistor each having a base, an emitter and a collector electrode, said emitter electrodes of said first and second transistors directly coupled to each other, said base electrodes of said first and second transistors resistively coupled to a first source of d.c. potential, said collector electrodes of said first and second transistors resistively coupled through a primary winding of a transformer to a second source of d.c. potential, the secondary winding of said transformer tuned to the resonant frequency of said multivibrator so that an output signal having a frequency equal to said resonant frequency is available across said secondary winding when said first and second d.c. potentials are substantially equal and in the absence of a critical component or circuit failure in either or both of said free-running multivibrator or said tuned secondary winding.

* * * * *